July 3, 1951
R. COVER
2,559,403
FLOTATION WASHER
Filed Dec. 26, 1946
3 Sheets-Sheet 2
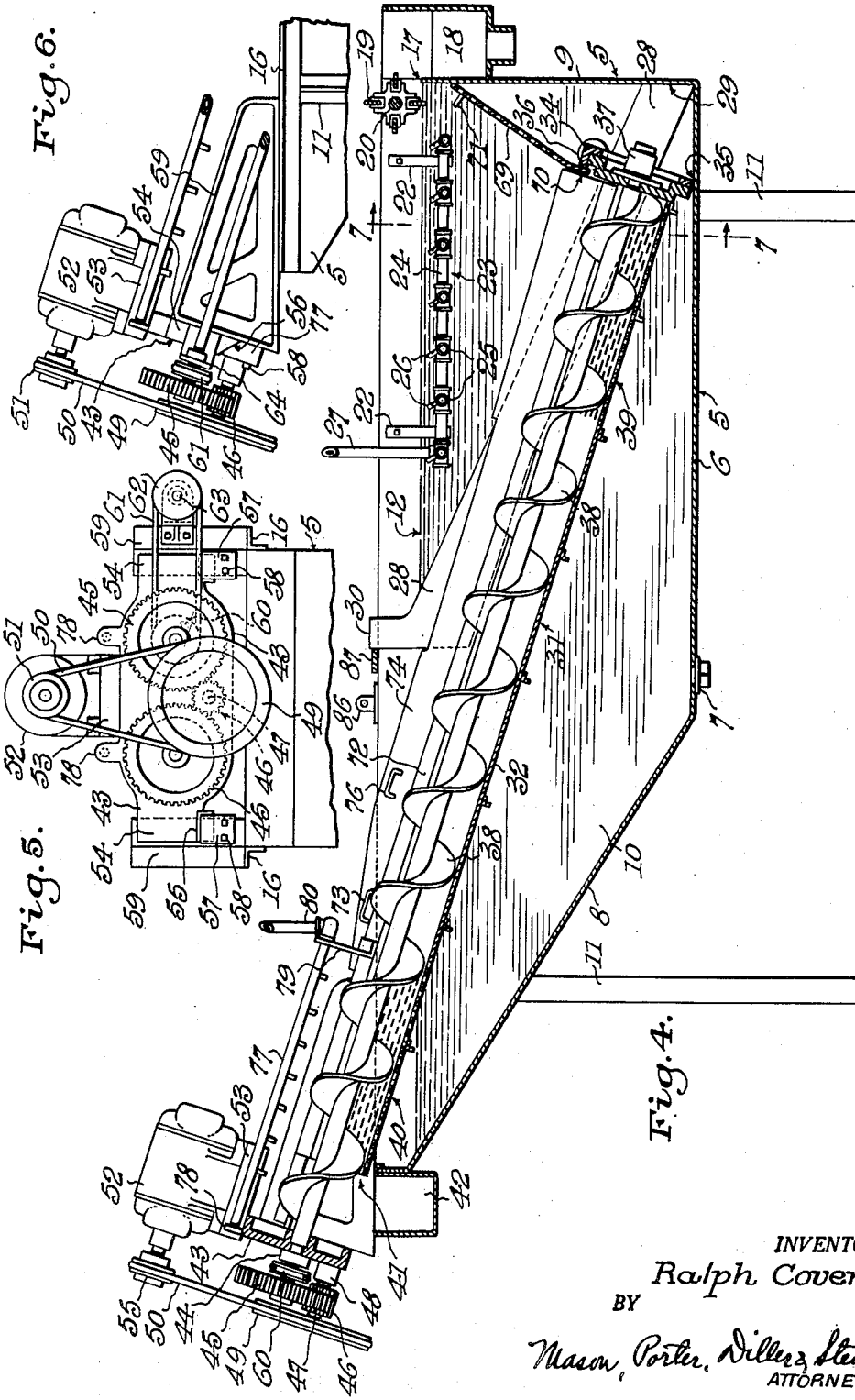
INVENTOR.
Ralph Cover
BY
Mason, Porter, Diller & Stewart
ATTORNEYS

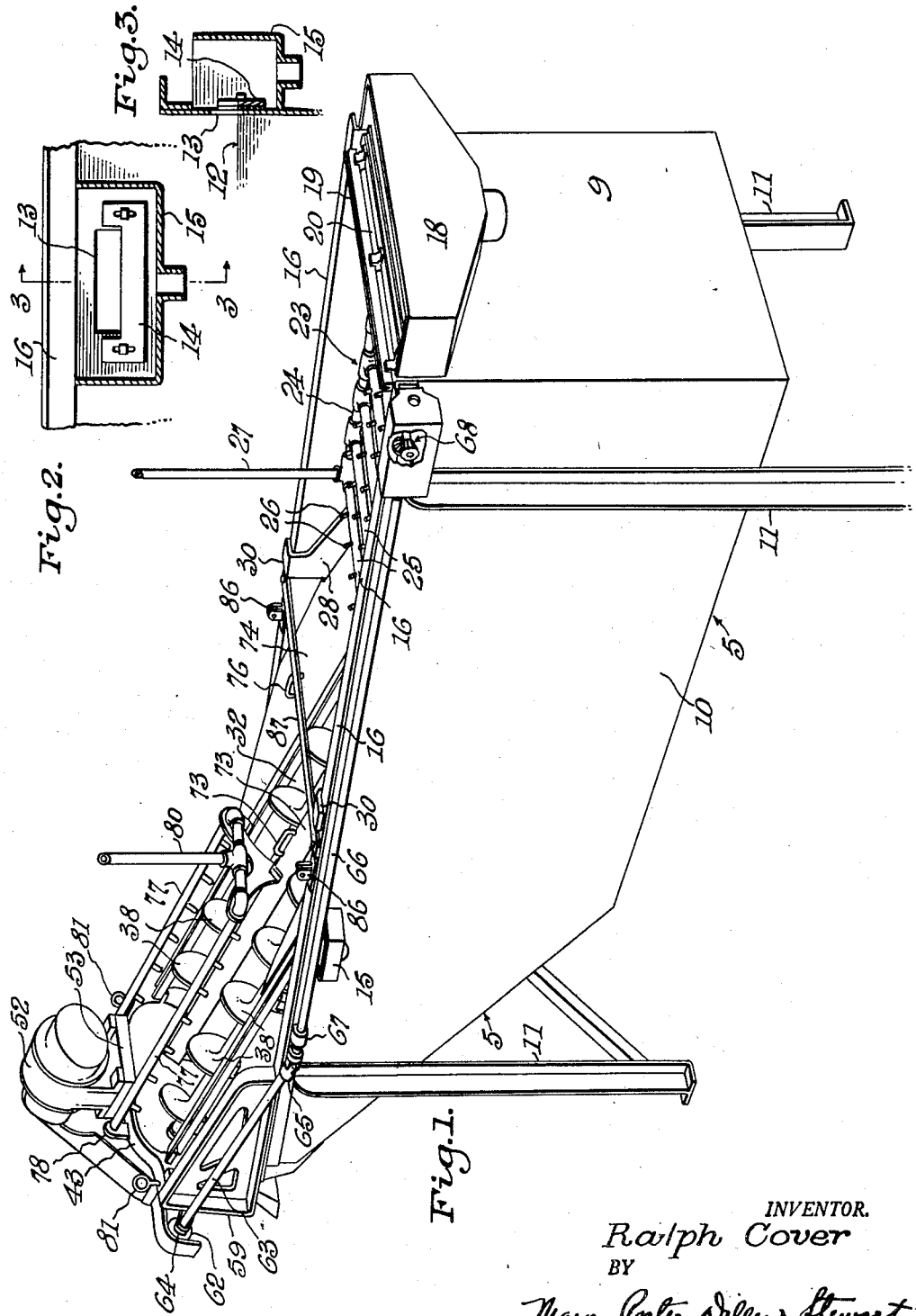

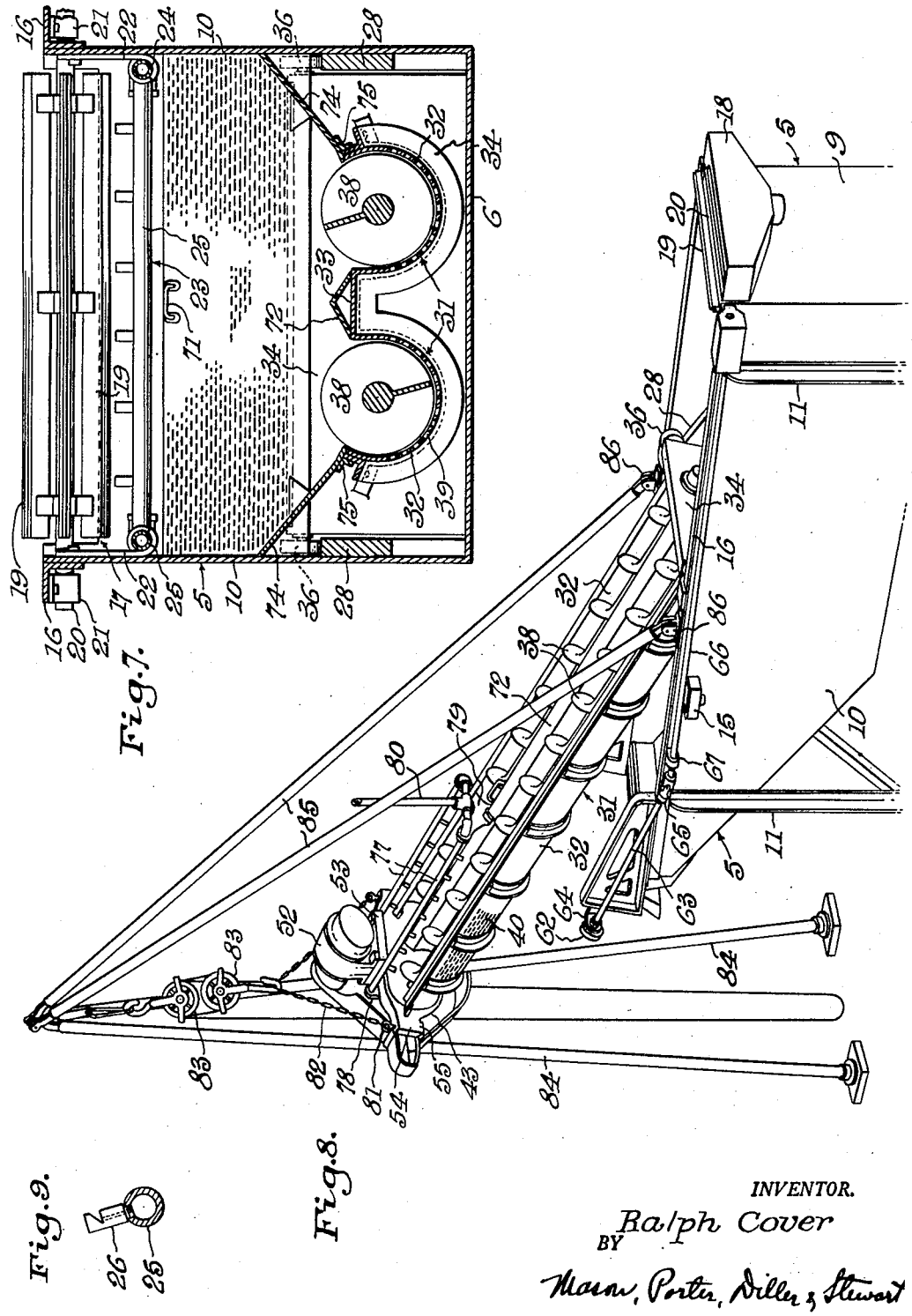

Patented July 3, 1951

2,559,403

UNITED STATES PATENT OFFICE 2,559,403

FLOTATION WASHER

Ralph Cover, Westminster, Md.

Application December 26, 1946, Serial No. 718,306

8 Claims. (Cl. 209—173)

The invention relates generally to washing and cleaning apparatus and primarily seeks to provide a novel flotation washer particularly adaptable to use in the washing of cut corn but which may be employed effectively in the washing of various other products of which peas and beans are examples.

I am aware that various forms of washing apparatus have been provided heretofore, but all such apparatus of which I am presently aware has been only partially acceptable for various reasons, such as the complexity of the structure and arrangement of the component parts, inefficiency in operation, and the lack of accessibility of structural components for thorough cleansing. In the production of apparatus to be used in the processing of foods it is absolutely essential that the component parts of such apparatus be so constructed and arranged that they can be frequently and thoroughly cleansed in order to maintain them in a state of substantial freedom from bacteria thereby to assure against bacteria build up in the processing of the food. It is a purpose of the present invention to provide an apparatus which will avoid the objections referred to, and in which the component parts are so constructed and cooperatively arranged that they can be frequently and thoroughly cleansed and maintained in a bacteria free state.

I have found also that presently known washing apparatus designed for the washing of cut corn has been unsatisfactory in its accomplishment of its intended purpose, one reason being the failure to wash the corn without loss of a considerable portion of the tender young corn kernels. Because of the fact that the specific gravity of corn and water is not at great variance, there has been a problem in presently known apparatus in preventing the washing away of tender young corn kernels with the cob tissues, silk, hulls, borer and ear worms and other debris. It is a purpose of the present invention to provide a novel washing apparatus capable of efficiently washing corn without danger of the tender young corn kernels being washed away with the rejected debris.

In its more detailed nature the invention resides in providing an apparatus of the character stated including a tank in which a level of water is maintained, trough means in the tank extending in inclined relation from the bottom at one end of the tank over the top of the other end of the tank, screw means rotatable in the trough means for conveying products upwardly through the trough means, drive means for the screw means, a debris receiving trough at the end of the tank in which the trough and screw means are immersed, a paddle wheel for lifting debris from the top of the water in the tank and depositing the same in the debris receiving trough, means for driving the paddle wheel, and means for providing a gentle current in the water toward the paddle wheel.

An object of the invention is to provide an apparatus of the character stated in which the trough means, the screw means and the screw driving means comprises a unitary assembly, and in which there are provided inclined runners engaged by rollers on said assembly so that by pulling upwardly and endwise on said assembly the same can be readily withdrawn from the bottom of the tank to permit thorough cleansing of the tank bottom and make parts of said assembly more readily accessible for cleansing and test or adjustment manipulation.

Another object of the invention is to provide in an apparatus of the character stated a plurality of deflector or guide members effective to direct gravitating products into the trough means, and means for supporting said members so that they can be readily lifted out for cleansing purposes and for rendering the whole bottom of the tank accessible for cleaning.

Another object of the invention is to provide an apparatus of the character stated in which the inclined runners also are readily removable to facilitate thorough cleansing of the tank.

Another object of the invention is to provide an apparatus of the character stated in which the gentle current inducing means comprises a readily removable frame composed of a multiple of generally horizontal ducts into which water is directed and which have nozzles for directing the water into the tank water just below the surfaces thereof and toward the paddle wheel.

Another object of the invention is to provide in an apparatus of the character stated novel means for maintaining the desired level of water in the tank regardless of any slight unevenness in the floor on which the apparatus is supported.

With the above and other objects in view that will hereinafter appear, the nature of the invention will be more clearly understood by reference to the following detailed description, the appended claims and the several views illustrated in the accompanying drawings.

In the drawings—

Figure 1 is a perspective view illustrating the invention.

Figure 2 is a fragmentary vertical longitudinal section illustrating one of the adjustable water level controlling ports.

Figure 3 is a vertical cross section taken on the line 3—3 on Figure 2.

Figure 4 is a vertical longitudinal section through the washer structure illustrated in Figure 1, the section being taken through the center of one of the screw troughs.

Figure 5 is a fragmentary end elevation illustrating the driving mechanism for the screws.

Figure 6 is a side elevation illustrating the parts shown in Figure 5.

Figure 7 is a vertical cross section taken on the line 7—7 on Figure 4.

Figure 8 is a perspective view illustrating the trough and screw assembly lifted out of its operative position in the tank.

Figure 9 is a fragmentary sectional view illustrating one of the gentle current inducing nozzles.

In the practical development of the invention, there is provided a tank structure generally designated 5 and comprising a generally horizontal bottom 6 equipped with a suitable drain 7, an upwardly inclined bottom portion 8, an upright end 9 and sides 10 which are also uprightly disposed. The tank structure is suitably supported above the ground or floor support on legs or standards 11.

A predetermined level of water is maintained in the tank as indicated at 12 through the medium of overflow ports 13 formed in the sides 10 of the tank. These ports are best illustrated in Figures 1, 2 and 3 from which it will be apparent that the bottom or overflow edge of each port is adjustable by vertical adjustment of the plate 14 so that the desired level of water in the tank can be assured regardless of any slight unevenness in the floor upon which the tank structure is supported. From the ports 13, the water overflows into discharge troughs 15 attached to the side walls 10 of the tank.

Angle irons 16 may be secured along the upper edges of the tank sides 10 in order to suitably reinforce the tank structure in the manner clearly illustrated in Figures 1, 3 and 7 of the drawings.

It will be apparent by reference to Figure 6 of the drawings that the upright end wall 9 of the tank structure terminates at a lower level than the side walls 10 so as to provide an overflow edge 17 which delivers into a waste and debris take-off trough 18 supported on said end wall. A paddle wheel 19 comprising a multiple of transverse blades is mounted close to the overflow edge 17 with the cross shaft 20 thereof rotatably supported as at 21 on the tank structure. The paddle wheel is so disposed that during the rotation thereof the blades dip slightly in the manner illustrated in Figure 4 into the water level within the tank structure so as to lift cob tissues, silk, hulls, borer and ear worms or other debris from the top of the water over the overflow edge 17 and into the take-away trough 18.

In strap hangers 22, attached to the tank sides 10, is mounted a water supplying, gentle current inducing frame structure generally designated 23. The frame structure 23 is removably supported in the hangers in the manner clearly illustrated in Figures 4 and 7 and composed of longitudinal side ducts 24 and transverse connecting ducts 25, the latter having nozzles projecting upwardly therefrom at a slight angle in the manner clearly illustrated in Figures 4 and 9 of the drawings so as to direct the water discharged therefrom slightly upwardly and toward the paddle wheel 19 in a manner for inducing a gentle current toward said paddle wheel at the top of the water level 12 in the tank structure. Water is supplied to the frame structure 23 through a supply duct 27. An inclined runner 28 is removably mounted against each side wall 10 with its lower end in abutting engagement as at 29 with the upright end wall 9 of the tank structure, and the upper end of each runner may be angled as at 30 to rest upon the respective reinforcing iron 16.

A trough means, generally designated 31, is removably mounted in the tank structure in the manner clearly illustrated in Figure 4 with the lower end thereof near the bottom of the tank at the end wall 9, and with its upper end extending over the upwardly inclined end extremity of the tank structure.

The trough means comprises two troughs 32 arranged side by side in parallel relation with a flat top 33 therebetween. At their lower ends, the troughs 32 are attached to a transverse end plate assembly 34 which rests on the bottom of the tank near the upright wall 9 as at 35 and serves as a support for two rollers 36 which rests on and are rollable along the removably mounted runner 28. See Figures 4, 7 and 8.

The end plate assembly 34 provides bearings as at 37 for two screws 38, one thereof being rotatable in each of the troughs 32. At its lower end, each trough is perforated, or open and provided with a screen as at 39, and at its upper end each trough is similarly screened as at 40. The provision of the screening means 39 and 40 permits free passage of water through the upper and lower end portions of the trough while retaining therein the corn kernels or other products to be conveyed upwardly through the troughs by the rotating screws 38. The troughs are open as at 41 at the top to deliver into a take-off trough 42.

It will also be noted by reference to Figures 1, 4, 5 and 6 of the drawings that the upper ends of the troughs 32 are attached to a transverse bearing plate 43 which provides bearings as at 44 for the screws 38. Each screen shaft has a spur gear 45 affixed thereon, and a pinion gear 46 secured on an idler shaft 47 which is supported as at 48 on the bearing plate 43 meshes with and is adapted to impart rotation to both said gears and the screws 38 attached thereto. A large pulley 49 is secured on the idler shaft 47 and is driven by a belt 50 from a small pulley 51 mounted on the shaft of the motor 52 which is supported as at 53 on the bearing plate 43.

The bearing plate 43 is provided with rest block extensions at the sides thereof, and each said extension has a bevelled lower end 55 which is receivable in a crotch 56 formed between a rest member 57 secured as at 58 to the end of a support frame piece 59 which is mounted on the respective reinforcing iron 16 of the tank structure. The engagement of the extension members 55 of the screw and trough assembly in the receiving crotches 56 serves to definitely place the trough and screen assembly when it is in the operative position illustrated in Figures 1 and 4 of the drawings.

One of the screw shafts has a pulley 60 affixed thereto, and a driver belt 61 passes over said pulley and over a pulley 62 mounted on a shaft 63 which is rotatably supported as at 64 on the adjacent frame piece 59. It will be apparent by reference to Figures 1 and 8 of the drawings that the shaft section 63 is connected by universal joints 65 with the shaft 66 which is rotatably supported as at 67 on the tank structure, and is connected by a bevel drive couple 68 with the shaft 20 of the paddle wheel 19 for driving the latter.

A downwardly and inwardly tilted screen plate 69 is provided at the lower end of the trough and screw assembly and rests upon the upright end wall 9 and as at 70 upon the bearing plate assembly 34. The screen plate is provided with a handle 71 so as to facilitate placement and removal thereof.

A center crest plate 72 is provided and rests upon and extends along the flat plate between the screw troughs 32 in the manner clearly illustrated in Figures 1, 4 and 7 of the drawings. This plate also is equipped with a handle 73 for facilitating mounting and removal thereof.

Side plates 74 also are provided and loosely rest against the tank sides 10 and as at 75 on the adjacent sides of the troughs 32. The side plates 74 also are provided with handles 76 to facilitate mounting and removal thereof.

It will be apparent by reference to Figures 1, 4 and 7 of the drawings that the several loosely mounted plates 69, 72 and 74 are so disposed as to guide the corn kernels or other products into the troughs 32 and prevent passage of said products into the space beneath and endwise of the trough and screw assembly within the tank structure 5.

Spray pipes 77 are provided at the upper end of the trough and screw assembly, they being supported as at 78 on the top bearing plate 43, and at 79 on the flat plate 33 which extends between the troughs 32. The spray pipes 77 are supplied with water through the supply pipe 80 and serve to direct sprays of water onto the upper ends of the rotating screws 38 and into the underlying troughs so as to wash products from the screws and cause the same to remain in the bottoms of the troughs and be conveyed by the screws into the discharge or take-off trough 42.

In the operation of the washing apparatus, the corn or other product is deposited in the tank structure on the water maintained at a predetermined level at 12 therein. Assuming that cut corn is being washed in the apparatus, the kernals will gravitate in the water and be guided by the plates 74, 72 and 69 into the troughs 32. Cob tissues, silk, hulls, borer and ear worms or other light debris will float on the surface of the water and be conveyed by the gentle current induced by the spray frame 23 into the zone of operation of the rotating paddle wheel 19 which will lift the same over the overflow edge 17 of the upright wall 9 of the tank structure and deposit the waste and debris into the receiving trough 18. The rotating screws will convey the washed corn upwardly in the troughs 32 and deposit the same into the receiving trough 42.

After each run, it is desirable to thoroughly cleanse all of the working parts of the apparatus, and in order to facilitate this cleansing operation, the water supplying and gentle current inducing spray frame 23 may be bodily removed from the supporting hangers 22, and the previously mentioned plates 69, 72 and 74 may be freely lifted out of the tank structure. Thereafter, the whole trough and screw assembly can be withdrawn from its operative position in the tank structure, or in other words from the operative position illustrated in Figures 1 and 4 to the out-of-the-way position illustrated in Figure 8.

In order to facilitate the removal of the trough and screw assembly, eyes 81 are secured to the rest block extensions 54 and a chain 82 may be attached to said eyes so that a hoist 83 supported on standards 84 resting upon the floor, and upon braces 85 attached as at 86 to the tank structure may be employed to draw the trough and screw assembly upwardly with the rollers 36 thereof rolling over the upper surfaces of the runners 28 in the manner clearly illustrated in Figures 7 and 8. The runners may be removably attached to the reinforcing angles 16 of the tank structure or they may merely be backed up by suitable transverse abutment means 87 in the manner illustrated in Figures 1 and 4.

It will be obvious that the runners 28 may be freely lifted out of the tank structure, and if desired the trough and screw assembly may be completely removed from the tank so as to additionally facilitate thorough cleansing of all parts of the apparatus, and also to permit the use of a single trough and screw assembly with a multiple of tank structures.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, a tank, means for maintaining a level of water in the tank, trough means in the tank extending in inclined relation from the bottom at one end of the tank over the top of the other end of the tank, screw means rotatable in the trough means for conveying products upwardly through the trough means, drive means for the screw means, a debris receiving trough at the end of the tank in which the trough and screw means are immersed, a paddle wheel for lifting debris from the top of the water in the tank and depositing the same in the debris receiving trough, means for driving the paddle wheel, means for providing a gentle current in the water toward the paddle wheel, rollers carried by the trough means, inclined runners mounted in the tank, and means for withdrawing the trough and screw means upwardly over said runners to clear the bottom of the tank and facilitate cleansing thereof.

2. In apparatus of the character described, a tank, means for maintaining a level of water in the tank, trough means in the tank extending in inclined relation from the bottom at one end of the tank over the top of the other end of the tank, screw means rotatable in the trough means for conveying products upwardly through the trough means, drive means for the screw means, a debris receiving trough at the end of the tank in which the trough and screw means are immersed, a paddle wheel for lifting debris from the top of the water in the tank and depositing the same in the debris receiving trough, means for driving the paddle wheel, means for providing a gentle current in the water toward the paddle wheel, rollers carried by the trough means, inclined runners mounted in the tank, said runners being readily removable from the tank, guide plates for guiding gravitating products into the trough means and resting by gravity on the tank walls and on the trough means so as to be subject to ready lifting out to facilitate cleansing of the tank, and means for withdrawing the trough and screw means upwardly over said runners to clear the bottom of the tank and facilitate cleansing thereof.

3. In apparatus of the character described, a tank means for maintaining a level of water in the tank, trough means in the tank extending in inclined relation from the bottom at one end of the tank over the top of the other end of the tank, screw means rotatable in the trough means for conveying products upwardly through the trough means, drive means for the screw means, a debris receiving trough at the end of the tank in which the trough and screw means are immersed, a paddle wheel for lifting debris from the top of the water in the tank and depositing the same in the debris receiving trough, means for driving the paddle wheel, means for providing a gentle current in the water toward the paddle wheel, rollers carried by the trough means, inclined runners mounted in the tank, and means for withdrawing the trough and screw means upwardly over said runners to clear the bottom of the tank and facilitate cleansing thereof, said trough means, said screw means and said drive means being assembled and movable as a unit.

4. In apparatus of the character described, a tank, means for maintaining a level of water in the tank, trough means in the tank extending in inclined relation from the bottom at one end of the tank over the top of the other end of the tank, screw means rotatable in the trough means for conveying products upwardly through the trough means, drive means for the screw means, a debris receiving trough at the end of the tank in which the trough and screw means are immersed, a paddle wheel for lifting debris from the top of the water in the tank and depositing the same in the debris receiving trough, means for driving the paddle wheel, means for providing a gentle current in the water toward the paddle wheel, rollers carried by the trough means, inclined runners mounted in the tank, and means for withdrawing the trough and screw means upwardly over said runners to clear the bottom of the tank and facilitate cleansing thereof, said trough means, said screw means and said drive means being assembled and movable as a unit, and there being included complementary interengaging means on said trough means and said tank effective to definitely place the trough means in its lowered, operative position in the tank.

5. In apparatus of the character described, a tank, means for maintaining a level of water in the tank, trough means in the tank extending in inclined relation from a receiving end in the bottom at one end of the tank to a discharge end over the top of the other end of the tank, screw means rotatable in the trough means for conveying products upwardly through the trough means, drive means for the screw means, a debris receiving trough at the end of the tank in which the trough and screw means are immersed, means for removing debris from the top of the water in the tank and depositing the same in the debris receiving trough, means for providing a gentle current in the water toward said debris removing means, upwardly and endwise inclined guiding means supporting the receiving end of said trough means, and means engageable with the trough means at its discharge end for bodily moving said trough and screw means endwise over said guiding means in the tank and for temporarily holding the lower receiving end of said trough and screw away from the bottom of the tank so as to clear the bottom of the tank and permit thorough cleansing of the tank bottom.

6. In apparatus of the character described, a tank, means for maintaining a level of water in the tank, trough means in the tank extending in inclined relation from a receiving end in the bottom at one end of the tank to a discharge end over the top of the other end of the tank, screw means rotatable in the trough means for conveying products upwardly through the trough means, drive means for the screw means, a debris receiving trough at the end of the tank in which the trough and screw means are immersed, means for removing debris from the top of the water in the tank and depositing the same in the debris receiving trough, means for providing a gentle current in the water toward said debris removing means, guide plates for guiding gravitating products into the trough means and resting by gravity on the tank walls and on the trough means so as to be subject to ready lifting out to facilitate cleansing of the tank, upwardly and endwise inclined guiding means supporting the receving end of said trough means, and means engageable with the trough means at its discharge end for bodily moving said trough and screw means endwise over said guiding means in the tank and for temporarily holding the lower receiving end of said trough and screw away from the bottom of the tank so as to clear the bottom of the tank and permit thorough cleansing of the tank bottom.

7. In apparatus of the character described, a tank, means for maintaining a level of water in the tank, trough means in the tank extending in inclined relation from the bottom at one end of the tank over the top of the other end of the tank, screw means rotatable in the trough means for conveying products upwardly through the trough means, drive means for the screw means, rollers carried by the trough means, inclined runners mounted in the tank, and means for withdrawing the trough and screw means upwardly over said runners to clear the bottom of the tank and facilitate cleansing thereof.

8. In apparatus of the character described, a tank, means for maintaining a level of water in the tank, trough means in the tank extending in inclined relation from the bottom at one end of the tank over the top of the other end of the tank, screw means rotatable in the trough means for conveying products upwardly through the trough means, drive means for the screw means, rollers carried by the trough means, inclined runners mounted in the tank, said runners being readily removable from the tank, guide plates for guiding gravitating products into the trough means and resting by gravity on the tank walls and on the trough means so as to be subject to ready lifting out to facilitate cleansing of the tank, and means for withdrawing the trough and screw means upwardly over said runners to clear the bottom of the tank and facilitate cleansing thereof.

RALPH COVER.

REFERENCES CITED

The following references are of record in the file of this patent:

UNITED STATES PATENTS

| Number | Name | Date |
| --- | --- | --- |
| 1,286,554 | Dekker | Dec. 3, 1918 |
| 1,743,179 | Zeb | Jan. 14, 1930 |
| 1,757,103 | Voigt | May 6, 1930 |
| 2,035,118 | Falkiner | Mar. 24, 1936 |
| 2,238,997 | Gaymon | Apr. 22, 1941 |
| 2,349,528 | Trostler | May 23, 1944 |